United States Patent Office 3,528,695
Patented Sept. 15, 1970

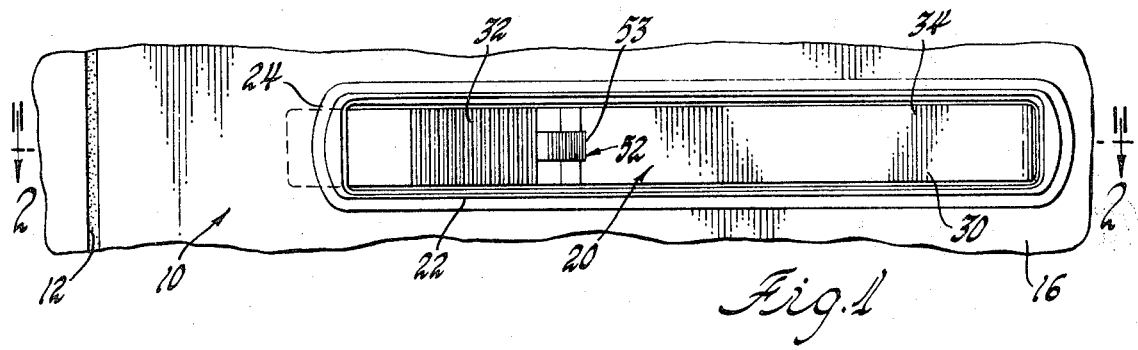
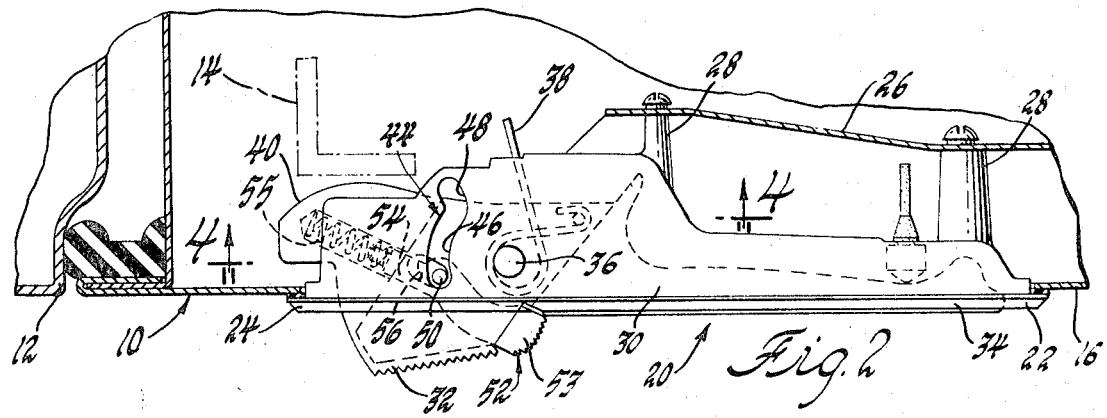
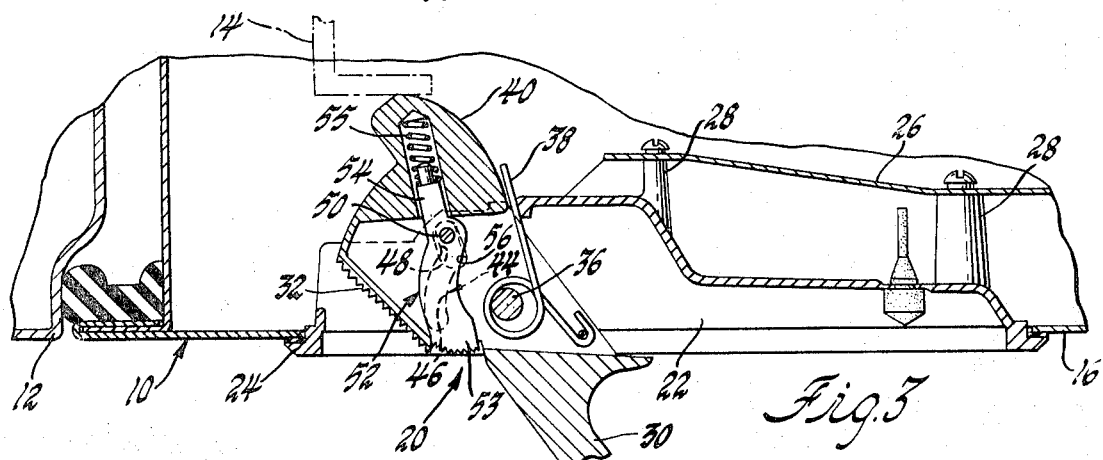
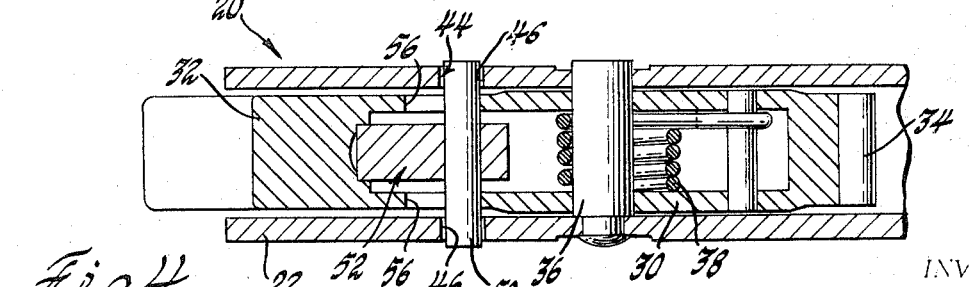

3,528,695
FLUSH TYPE DOOR HANDLE FOR VEHICLE BODIES
Theodore F. Peters, Utica, Mich., assignor to General Motors Corporation, Detroit, Mich., a corporation of Delaware
Filed Nov. 21, 1968, Ser. No. 777,725
Int. Cl. E05b 3/00
U.S. Cl. 292—336.3      4 Claims

ABSTRACT OF THE DISCLOSURE

A flush type outside operating vehicle body door handle pivotable on an escutcheon on the door between a flush inoperative position and an extended operative position operating the door latch is further provided with a thumb operated handle latching member responsive to thumb pressure when the handle is swung to its operative extended position to selectively hold the handle in such position thereby facilitating the application of door closing forces through the handle member and specifically to accomplish the keyless locking function in the door latch.

---

This invention relates to vehicle body door handles and more particularly to flush type outside operating door handles for vehicle bodies.

The primary feature of this invention is in the provision of flush type operating outside door handle for vehicle body doors and door latches and of the type including a finger gripping portion movable between a flush inoperative position and an extended operative position functional for release of a vehicle body door latch, with manually operable handle latching means being included to selectively positively maintain the handle in the operative extended position of the gripping portion such that door closing forces may be applied through the handle and to concurrently operate the vehicle body door latch in a keyless locking mode thereof.

Another feature of this invention is in the use of a flush type handle according to the foregoing particularly comprised of integrally formed member and wherein the handle latching means may be selectively operated by thumb pressure applied to an operating member mounted in the thumb portion of the handle member.

A further feature of the invention is in the use of handle latching means responsive to the thumb operated member particularly including pin and slot structure formed in a handle escutcheon and on such thumb operated member actuable when the handle member is swung to its operatvie position relative to the escutcheon but otherwise prevented from latching engagement until such operative position is reached thereby assuring that the consciously intended keyless locking of the vehicle body door latch will in fact be accomplished.

These and other features and advantages of the invention will be readily apparent from the following description and from the drawnigs wherein:

FIG. 1 is a fragmentary side elevational view of a vehicle body door structure including a flush type outside operating door handle according to this invention;

FIG. 2 is a sectional view taken generally along the plane indicated by lines 2—2 of FIG. 1 showing the handle in the flush inoperative position;

FIG. 3 is a view similar to FIG. 2 showing the handle latched in the opeartive extended position thereof; and FIG. 4 is an enlarged sectional view taken generally along the plane indicated by lines 4—4 of FIG. 2.

Referring now particularly to FIG. 1 of the drawings the flush type outside operating door handle assembly according to the invention is shown mounted on a swingable vehicle body door 10 and particularly adjacent the rearward or free swinging edge portion thereof which in its fully closed position lies generally flushly adjacent a door pillar or jamb structure 12 of the vehicle body. Door 10 will be understood as being mounted by hinges adjacent the remote forward or other edge portion of the vehicle body for swinging movement away from the jamb 12 from the fully closed position shown to a fully opened position, not shown. It will be understood also that door 10 and jamb 12 are provided with a suitable latch and latch striker structure at this swinging edge portion to selectively hold and lock the door in the fully closed position. Such a latch structure may accord generally with the details disclosed in the Fox et al. Pat. 3,190,682 issued June 22, 1965 and assigned to the assignee of the present invention.

As is typical with latches such as that of Fox et al. produced in vehicles of the assignee's manufacture, the latch structure includes the functional features of automatic undogging and keyless locking, referring respectively to the automatic cancellation during door closing movement of a manually selected locked condition of the door latch established prior to the door being slammed shut, and to the negation of such cancellation by conscious manipulation of such means as the outside door handle while so slamming the door shut thereby to maintain the latch in locked condition and avoid the necessity of replacing it in such condition by the use of an exterior key lock cylinder or other locking actuator.

It is not believed required that the structural and functional details of such latch and lock functions be further shown herein, but reference is made generally thereto by the appearance in the drawings of a latch release lever indicated generally at 14, such lever being adapted for opeartive association with an outside operating door handle assembly to accomplish the outside latch release and keyless locking functions for the latch. Such latch release lever is shown disposed adjacent the outer panel 16 of the door 10 and movable from a normal or rest position to an actuated position toward the door inner panel, not shown, to achieve the above noted functions in the door latch.

The flush type handle assembly of this invention, designated generally as 20 includes an escutcheon or housing 22 of narrow elongated and hollow configuration and received in a suitable aperture in the door outer panel 16 adjacent the latch release lever 14. The escutcheon includes a decorative outer flange or lip 24 overlying the margins of the outer panel aperture and the escutcheon is suitably secured to inner or reinforcing panel structure 26 of the door by screws threaded into integrally formed boss formations 28 of the escutcheon.

The escutcheon 22 has received between upper and lower walls thereof an elongated handle member 30 including integrally formed thumb and finger gripping portions 32 and 34. The handle member 30 is pivotally mounted in the escutcheon 22 by means of a pivot stud 36 press or otherwise securely fitted in opposite aligned apertures in the top and bottom walls of the escutcheon and extending with rotation clearance through similarly aligned apertures in a hollow portion of handle member 30. The handle member is thus swingable between an inoperative position, shown in FIG. 2, wherein the gripping portion 34 lies substantially flush with the door outer panel 16 and within the confines of the escutcheon and with the push button or thumb portion 32 lying in a projecting position, to the extended or operative position shown in FIG. 3. A coil torsion spring 38 wrapped about the pivot stud 36 and seated between the handle member and the escutcheon biases the handle member to the inoperative position of FIG. 2. The range of travel between such positions as shown is planned with relation to the travel of the latch release lever 14 laterally toward the door inner panel from the normal position shown in FIG. 2, to the latch operating position indicated in FIG. 3 wherein the latch release lever operates on the door latch for release from the outside for door opening or for keyless locking while closing the door. In moving from the inoperative to the extended or operative position, handle member 30 picks up the latch release lever 14 through engagement therewith by a contoured or rounded cam surface 40 on the inner side of the handle thumb portion 32.

In order to securely and positively maintain handle member 30 in its extended operative position shown in FIG. 3, handle latching means are provided directly in the handle member and the escutcheon for response to selected conscious manual pressure applied to a portion of the handle. More particularly, such latching means take the form of a latching pin and cooperating slot between the handle member 30 and the escutcheon 22 cooperable to permit unimpeded swinging movement of handle member 30 from the inoperative flush position of FIG. 2 to the operative position of FIG. 3, and when the handle reaches such operative position, selectively operable to latch the handle member against movement relative to the escutcheon from such position.

Referring particularly to FIGS. 2 and 4, escutcheon 22 is provided in its upper and lower walls with a pair of contoured keeper slots 44 including a first portion 46 formed generally arcuate about the center of pivot stud 36, and a further keeper portion 48 divergent from portion 46 and directed generally radially of the pivot stud. A latching pin 50 extends between such slots 44 to have its opposite end portions received therein and is mounted in an actuating push button 52 slidably received within thumb portion 32 of handle member 30. More particularly, a thumb portion 53 of the push button is slidably received in an aperture in thumb portion 32 while an interior end portion 54 is received slidably in a bore in such handle thumb portion. The push button is reciprocable under thumb pressure applied to portion 53 between a normal or extended position shown in FIG. 2, located under the action of a coil compression spring 55 and a depressed latching position shown in FIG. 3 against the action of such spring. The range of movement of the push button is defined by the length of a pair of slots 56 in the thumb portion 32 of the handle member, seen best in FIG. 4, receiving the latching pin 50.

Assuming now that the handle assembly is in the condition of parts shown generally in FIG. 2 with the door 10 in closed position that it is desired to open the latter, thumb pressure is applied to thumb portion 32 to swing the handle member 30 clockwise against the action of spring 38 until sufficient exposure is had of finger gripping portion 34 enabling grasping thereof by the fingers, whereupon continued pull on such portion completes rotation of the handle member fully to the operative extended position thereof shown in FIG. 3. During such rotation, the cam surface 40 picks up the latch release lever 14 and moves it fully to the latch actuating position shown in FIG. 3, the door latch thus being released for opening movement of door 10 to the fully opened position thereof, not shown.

Assuming that it is then desired to employ the handle member 30 in moving door 10 to the fully closed position while concurrently actuating the latch release member 14 to accomplish the keyless locking function of the door latch, thumb pressure may be applied if necessary to the thumb portion 32 of the handle member to facilitate gripping of the portion 34 whereupon forces may be applied through the grasped handle member to the door 10 in a closing direction. In order to insure that the handle member 30 is maintained in such operative position during the application of the closing forces to the door, thumb pressure is applied to the push button 52 moving it inwardly in relation to the thumb portion 32 from the extended position of FIG. 2 to the depressed relation of FIG. 3 wherein the latching pin 50 may cooperate with the locking portion 48 of the locking slots 44. It will be noted that during oscillation of the handle member 30 from the inoperative to the operative extended positions, latching pin 50 oscillates in the slot portions 46 and that these slot portions will prevent any reciprocation of the push button 52 and the latching pin 50 toward the depressed or locked condition thereof. Note also that the end of slot portions 46 define the limit of clockwise rotation of the handle member by engagement of the latching pin at such slot ends. Once, however, the handle member 30 is located fully in the operative position shown in FIG. 3 relative to the escutcheon 22, the latching pin and push button are aligned to the latching portion 48 of the slots to permit depression of the pin to the relation shown in FIG. 3 wherein the pin is juxtaposed to the edges of the slots to prevent return or counterclockwise rotation of handle member 30 from the operative position. Accordingly, with the handle member so located and with the push button 52 depressed by the thumb, the manual closing forces applied to the handle member may proceed without any tendency of the handle member to return toward the flush inoperative position perhaps a distance sufficient to allow movement of the latch release lever 14 from its keyless locking position resulting in unwanted automatic undogging in the door latch. Once door 10 has been closed and latched again in the position of FIGS. 2 and 3, thumb pressure may be released from the push button 52 allowing return of the latching pin 50 to the slot portions 46 by the spring 55 whereupon manual release from gripping portion 34 will allow the torsion spring 38 to return the handle member 30 to the flush inoperative position.

It is to be appreciated that the above described prevention of movement of latching pin 50 and push button 52 to depressed latching condition afforded by the blocking action of slot portions 46 is useful in assuring that the handle member 30 will in fact be fully rotated to the operative position causing full actuating movement of latch release lever 14. Thus, the keyless locking function of the door latch is assured when the door 10 is slammed shut instead of perhaps an incomplete rotation of the handle member insufficient for keyless locking operation and a consequent unwanted automatic undogging in the latch requiring a remanipulation of the lock and latch parts and of the door 10 to again attempt keyless locking of the door.

Having thus described the invention, what is claimed is:

1. In a vehicle body including a door movable between fully open and fully closed positions and a door latch provided with automatic undogging and keyless locking features and having a latch release member, flush type operating door handle means comprising, a handle including a thumb portion and a finger gripping portion, means mounting said handle on said door for movement of said handle between an inoperative position wherein said gripping portion lies substantially flush with said door and an operative position wherein said handle operates said latch release member of said door latch and wherein said gripping portion extends from said door, means on said handle member and on said door selectively operable in the operative position of said handle to positively hold the same therein in any position of said door between the fully open and fully closed positions thereof, and a member mounted in said thumb portion of said handle and responsive to thumb pressure applied thereto in the operative position of said handle to operate said handle holding means whereby forces may be applied through said handle to move said door to the fully closed position thereof while concurrently operating said latch release member to cause keyless locking of said door latch.

2. The flush type operating door handle means recited in claim 1, further including means on said pressure responsive member and said door preventing operation of said handle holding means in all other positions of said handle except said operative position thereof.

3. The flush type operating handle means recited in claim 1 wherein said handle holding means includes pin means and cooperating slot means on said handle and on said door, said slot means including a first portion permitting freewheeling of said handle from the inoperative to the operative position thereof and a latching portion for receiving said pin in the operative position of said handle member under the thumb pressure applied to said responsive member to latch said handle member in said operative position thereof.

4. In a vehicle body including a door movable between fully open and fully closed positions and a door latch having automatic undogging and keyless locking features and having a latch release member, flush type operating door handle means comprising, a door handle member including integral thumb and finger gripping portions, an escutcheon on said door, means mounting said handle member on said escutcheon for pivotal movement between an inoperative position wherein said gripping portion lies substantially flush with the door and an operative position, means for connecting the thumb portion of said handle member with said latch release member, said handle member in the operative position thereof operating said latch release member and said gripping portion being located in an extended position relative to said door, latching pin means mounted on said handle member for limited movement therein between inoperative and handle latching positions, means biasing said latching pin means to the inoperative position thereof, slot means in said escutcheon receiving said latching pin and including a first portion permitting freewheeling of said latching pin means therein and said handle member during movement of the latter from the inoperative to the operative position thereof and further including a latching portion in divergent relation with said freewheeling portion and adapted to receive said latching pin upon movement of the latter from the latching to the unlatching position thereof when said handle member is in the operative position thereof, and an actuating member mounted movably in said thumb portion of said handle member and connected with said latching pin for movement of the latter from the inoperative to the handle latching position thereof under thumb pressure applied to said actuating member.

References Cited
UNITED STATES PATENTS

| | | | |
|---|---|---|---|
| 2,710,213 | 6/1955 | Hottel | 292—207 |
| 3,153,552 | 10/1964 | Sandor | 292—336.3 |
| 3,153,553 | 10/1964 | Sandor | 292—336.3 |

RICHARD E. MOORE, Primary Examiner

E. J. McCARTHY, Assistant Examiner

PO-1050
(5/69)

UNITED STATES PATENT OFFICE
CERTIFICATE OF CORRECTION

Patent No. 3,528,695          Dated September 15, 1970

Inventor(s) Theodore F. Peters

It is certified that error appears in the above-identified patent and that said Letters Patent are hereby corrected as shown below:

Column 1, line 43, after "integrally formed" insert --or related thumb and finger gripping portions in the handle--. Column 1, line 67 and Column 2, line 35, "opeartive" should read --operative--.

SIGNED AND
SEALED
DEC 22 1970

(SEAL)
Attest:

Edward M. Fletcher, Jr.
Attesting Officer

WILLIAM E. SCHUYLER, JR.
Commissioner of Patents